(No Model.)

A. J. WOLFF.
VEHICLE WHEEL.

No. 556,122. Patented Mar. 10, 1896.

Witnesses:
S. W. Potts.
Fred. J. Dole.

Inventor:
Arthur J. Wolff

ANDREW B. GRAHAM, PHOTO-LITHO, WASHINGTON, D.C.

UNITED STATES PATENT OFFICE.

ARTHUR J. WOLFF, OF HARTFORD, CONNECTICUT.

VEHICLE-WHEEL.

SPECIFICATION forming part of Letters Patent No. 556,122, dated March 10, 1896.

Application filed November 9, 1895. Serial No. 568,436. (No model.)

*To all whom it may concern:*

Be it known that I, ARTHUR J. WOLFF, a citizen of the United States, residing at Hartford, in the county of Hartford and State of Connecticut, have invented certain new and useful Improvements in Vehicle-Wheels, of which the following is a specification.

This invention relates to vehicle-wheels, but more especially, however, to that class of wheels known in the art as "bicycle" and "tricycle" wheels; and the object of the invention is to provide a wheel of this character whereby, when the spokes become broken, the same may be quickly and easily removed and replaced, and whereby also the tension thereof may be regulated for properly truing the wheel and maintaining the same in proper condition for use and for regulating the stability of the wheel, as required, for carrying varying loads.

A further object of my invention is to provide a wheel in which the spokes thereof may be interchangeable and of the same length.

Figure 1:
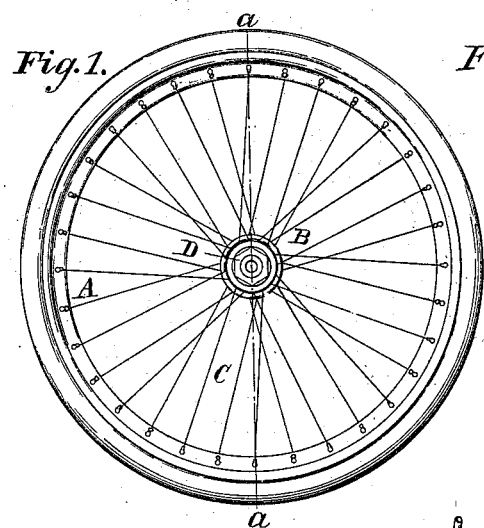
Figure 2:
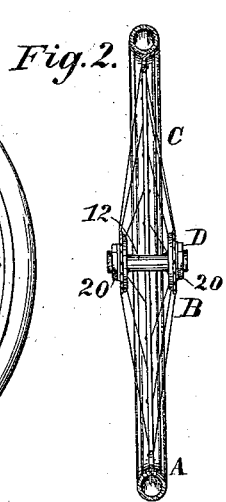
Figure 3:
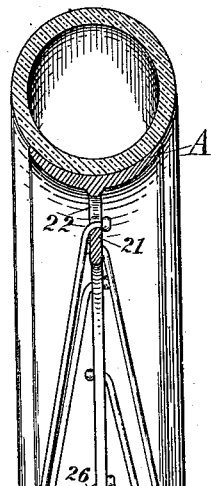
Figure 4:
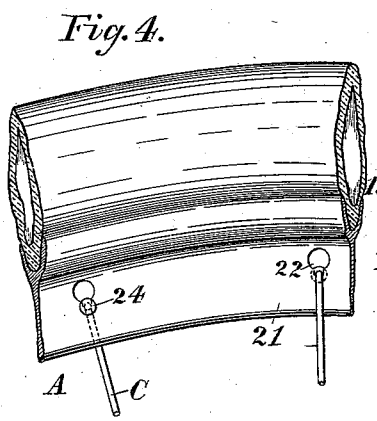
Figure 7:
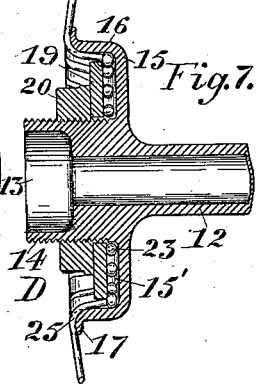
Figure 5:
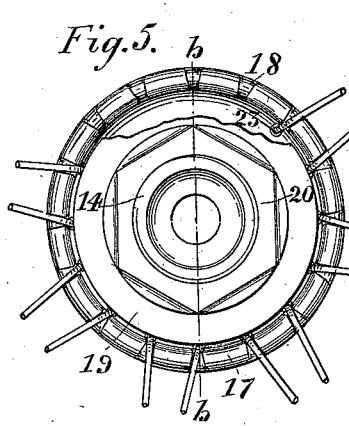
Figure 6:
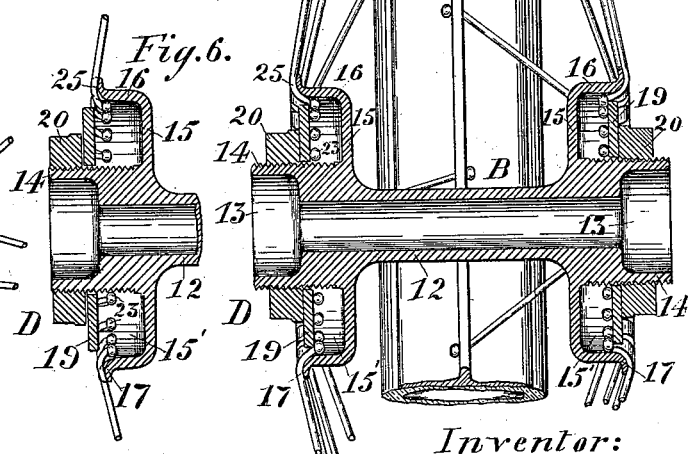

In the acccompanying drawings, forming part of this specification, Figure 1 is a side elevation of one form of bicycle-wheel constructed in accordance with my improvement. Fig. 2 is a cross-sectional view of said wheel, taken in dotted line $a\ a$, Fig. 1, a part thereof being shown in elevation. Fig. 3 is a partly-sectional view, on an enlarged scale, of a portion of a wheel, likewise taken in line $a\ a$, Fig. 1, for more clearly illustrating my improvement. Fig. 4 is a side view of a portion of a wheel-rim and its tire, for showing the connection of the spokes therewith. Fig. 5 is an end view of the wheel-hub, a part thereof being broken away, and showing the ends of some of the spokes in position relatively thereto. Fig. 6 is a sectional view taken in line $b\ b$, Fig. 5, and showing one position of the adjusting means for holding said spokes in position relatively to the hub; and Fig. 7 is a view similar to Fig. 6, showing a different position of the spoke-adjusting means.

Similar characters designate like parts in all the figures of the drawings.

In the preferred form thereof herein shown and described the wheel consists of a rim, (designated in a general way by A,) a hub, (designated in a general way by B,) and a series of spokes (designated in a general way by C) connecting said rim and hub, together with suitable adjusting means (designated in a general way by D) for removably securing and regulating the longitudinal tension of said spokes relatively to the hub, and whereby said spokes can be quickly and easily removed and replaced and the longitudinal tension thereof be quickly and easily regulated to properly true the wheel and maintain the same in proper condition for use.

The hub B of the wheel may be of any suitable or well-known construction, so far as concerns that portion thereof which is supported on the axle or shaft, and in the form shown the hub has the usual bearing portion 12 for receiving the axle or shaft of the wheel and is provided at its ends with the usual cup or roller bearing members 13. The hub B, however, in the preferred construction herein shown and described, is provided adjacent to each end thereof with an enlarged exteriorly-screw-threaded portion 14, having at the inner parts thereof spoke-flanges 15, adapted to support the spokes in their proper positions, and which coact with the spoke-adjusting means hereinafter described for regulating the tension of said spokes, and which are herein shown in the nature of chambered or cup flanges opening in opposite directions to each other and the rims 16 thereof preferably encircling a part of the screw-threaded portions 14 of the hubs. The outer edges 17 of said rims 16 are preferably curved or flared outwardly and are provided with suitable notches or recesses 18 in their peripheries, in which the several spokes are set, as hereinafter described.

The spoke-adjusting means D, which is in duplicate and which coacts with the spoke-flanges for holding the flanges in position relatively to the hub and also for regulating the longitudinal tension thereof, consists, in the preferred form shown, of a suitable disk or member 19, movable on each of the screw-threaded portions 14 of the hub and adjustable thereon by means of a suitable adjusting device, (shown in the nature of an interiorly-threaded nut 20,) whereby said member 19 can be forced into the chamber or space 15' within the rim 16 and thereby clamp and adjust the spokes therein, as hereinafter described.

The rim A of the wheel, in the form shown, is preferably T-shaped in cross-section, the inner flange, 21, thereof being provided with suitable apertures (shown in the form of buttonholes 22) for securing the spokes therein.

In the construction shown the spokes C are preferably of equal length, and are provided with bent or curved ends 25 and 26, having heads or enlarged portions 23 and 24 at each end thereof, whereby, when the spokes are assembled, the heads, as 24, at one end extend through the "buttonholes" 22 of the flange 21 of the rim and are drawn in the narrow slot of the same and held against displacement by said heads 24, which are drawn into firm engagement with the rim-flange 21 when the opposite ends of the spokes are properly adjusted in position relatively to the hub. The opposite ends of the spokes extend around the curved edges 17 of the rims 16 of the flanges 15, each spoke being seated within a notch or recess 18, and the heads, as 23, thereof lying and adjustable within the chambers of said flanges and engaged by the adjusting means D, the disks or members 19 of which engage the heads of the spokes and are clamped thereagainst by the adjusting-nuts 20, whereby the spokes are rigidly held in position and hold the tire-rim and hub in operative connection with each other. By turning the nuts to force the regulating disks or members 19 into the cup-shaped flanges 15 the ends of the spokes will all be forced around the curved or rounded edges of the rims simultaneously, thereby regulating the longitudinal tension of the spokes and straining the tire or rim of the wheel, as may be required.

It will be understood that, in practice, the buttonholes or apertures of the tire-rim flange will lie in a circular plane concentric to the axis of the wheel, and that the spoke-engaging rim 16 will, likewise, be arranged in a circle concentric to the buttonholes of the tire-rim, whereby the spokes can be made of the same length, and whereby in assembling the same it is only necessary to hook one end thereof in the buttonholes of the rim and then place the opposite ends thereof in position within the chambers 15' of the flanges and clamp the same in position by the adjusting means D.

By making the spokes of the same length and interchangeable the cost of manufacture, setting up and centering of the wheel is not only reduced but the repairing thereof is facilitated, as when a spoke becomes broken it can be quickly and easily removed and replaced by a perfect spoke.

It will also be obvious that the spokes can be quickly and easily adjusted and the longitudinal tension thereof properly maintained at all times, it being simply necessary to actuate the adjusting means D to increase or decrease the longitudinal tension of the spokes and thereby properly true the tire and its carrying-flange.

While I have shown a nut as a preferable means for actuating the straining disk or washer, yet it is understood that my invention is not limited thereto, as various well-known devices could be adopted as a substitute for such nut if deemed advisable.

Having thus described my invention, I claim—

1. A wheel comprising a rim; a hub having chambered flanges; spokes connected to said rim and having their opposite ends placed within the chambers of said flanges; and means independent of and separable from the spokes for holding and simultaneously adjusting said spokes, said means bearing against the spoke-heads, substantially as, and for the purpose specified.

2. A wheel consisting of a rim, a hub having chambered flanges opening in opposite directions to each other; spokes connected to said rim, and having their opposite ends placed within said flanges; and means independent of and separable from the spokes for bearing against the spoke-heads and thereby simultaneously holding and adjusting the spokes.

3. A wheel consisting of a rim; a tubular hub having exteriorly-screw-threaded ends and having chambered flanges; spokes connected to said rim, and having enlarged heads at the opposite ends thereof and adjustable within the chambers of said flanges; and means engaging the screw-threads of the hubs, for holding and adjusting said spokes therein to regulate the longitudinal tension thereof.

4. A wheel consisting of a rim; a hub having exteriorly-screw-threaded ends and having chambered flanges; spokes connected to said rim and having enlarged heads at the opposite ends thereof lying, and adjustable, within the chambers of said flanges; a disk movable on each of said threaded ends and engaging said enlarged heads of the spokes; and a screw-threaded nut adjustable on each of said threaded ends for adjusting said disks, and thereby clamping and adjusting said enlarged ends within said chambered flanges to regulate the longitudinal tension of the same.

5. A wheel consisting of a rim; a hub having chambered flanges opening in opposite directions to each other; interchangeable spokes connected to said rim, and having the opposite ends thereof lying, and adjustable, within the chambers of said flanges; and means adjustable on said hub for laterally clamping and adjusting said spoke ends within said chambered flanges to regulate the longitudinal tension of said spokes.

6. A wheel consisting of a rim having buttonhole-slots therein; a hub having enlarged exteriorly-screw-threaded ends, and having cup-shaped flanges opening in opposite directions to each other, and provided with curved or flaring outer edges having radial notches therein; spokes having curved or bent ends and enlarged heads, one series of bent ends and heads engaging the buttonhole-slots of the rim, and the opposite series of ends and enlarged heads extending around and engaging the notches of the curved edges of the flanges and lying, and adjustable, within said flanges, respectively; a disk movable on each of said threaded ends of the hub and engaging the enlarged ends of said spokes; and a threaded nut also movable on each of said threaded ends of the hub for engaging said movable disks, and thereby clamping and adjusting the ends of said spokes within said flanges to regulate the longitudinal tension thereof.

ARTHUR J. WOLFF.

Witnesses:
FRED. J. DOLE,
R. W. PITTMAN.